US012221811B2

(12) United States Patent
Xu

(10) Patent No.: US 12,221,811 B2
(45) Date of Patent: Feb. 11, 2025

(54) MAINTENANCE WINDOW LOCKING DEVICE

(71) Applicant: ZTE Corporation, Shenzhen (CN)

(72) Inventor: Xiaohui Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 271 days.

(21) Appl. No.: 17/776,811

(22) PCT Filed: Aug. 31, 2021

(86) PCT No.: PCT/CN2021/115659
§ 371 (c)(1),
(2) Date: May 13, 2022

(87) PCT Pub. No.: WO2022/048536
PCT Pub. Date: Mar. 10, 2022

(65) Prior Publication Data

US 2022/0403681 A1 Dec. 22, 2022

(30) Foreign Application Priority Data

Sep. 1, 2020 (CN) ......................... 202010902400.7

(51) Int. Cl.
*E05B 65/06* (2006.01)
*E05B 65/00* (2006.01)
(Continued)

(52) U.S. Cl.
CPC .............. *E05B 65/006* (2013.01); *E05C 3/12* (2013.01); *E05D 3/02* (2013.01); *E05D 5/14* (2013.01)

(58) Field of Classification Search
CPC ......... B65D 43/16; B65D 43/22; E05B 65/00; E05B 65/006; E05B 65/0075;
(Continued)

(56) References Cited

U.S. PATENT DOCUMENTS 1,739,911 A * 12/1929 Mcmurray ............... F16J 13/18
292/259 R
1,979,826 A * 11/1934 Fernandez .............. E05C 17/38
16/85
(Continued)

FOREIGN PATENT DOCUMENTS

CN 201967260 U * 9/2011
CN 202645217 U * 1/2013
(Continued)

OTHER PUBLICATIONS

International Searching Authority. International Search Report and Written Opinion for PCT Application No. PCT/CN2021/115659 and English translation, mailed Nov. 30, 2021, pp. 1-9.
(Continued)

*Primary Examiner* — Carlos Lugo
(74) *Attorney, Agent, or Firm* — Vivacqua Crane, PLLC

(57) ABSTRACT

A maintenance window locking device includes a maintenance window body (1), a maintenance window cover (2), a fastening plate (3), a first limiting mechanism (1a) including a groove, and a roller (3a). The fastening plate (3) includes a fastening plate body and a pin (3c) which are of an integrated structure. The pin (3c) is rotatably connected to the roller (3a). The maintenance window body (1) is hinged to a first end of the maintenance window cover (2). The fastening plate body is rotatably connected to a second end of the maintenance window cover (2). The first limiting mechanism (1a) is located on the maintenance window body (1). The fastening plate body drives the maintenance window cover (2) to move toward the maintenance window body (1). The roller (3a) rolls along the first limiting mechanism (1a) until the roller is clamped into the groove, such that the maintenance window cover (2) and the maintenance window body (1) are tightly attached.

7 Claims, 6 Drawing Sheets

(51) Int. Cl.
*E05C 3/12* (2006.01)
*E05D 3/02* (2006.01)
*E05D 5/14* (2006.01)

(58) Field of Classification Search
CPC ......... Y10T 292/0811; Y10T 292/0824; Y10T 292/1039; Y10T 292/20; Y10T 292/216; Y10T 292/223; E05C 3/043; E05C 3/045; E05C 3/12; E05D 11/00; Y10S 292/11
USPC .......................................................... 220/315
See application file for complete search history.

(56) References Cited

U.S. PATENT DOCUMENTS

| | | | | |
|---|---|---|---|---|
| 3,628,817 A * | 12/1971 | Sheahan | E05C 19/14 | 292/66 |
| 4,622,902 A * | 11/1986 | Miller | F16J 13/20 | 292/DIG. 60 |
| 4,655,488 A * | 4/1987 | Friedrichs | C10B 25/12 | 292/64 |
| 6,592,156 B2 * | 7/2003 | Levine | E05C 19/04 | 292/341.15 |
| 6,952,940 B2 * | 10/2005 | Molzer | E05B 13/002 | 70/210 |
| 2016/0167842 A1 | 6/2016 | Chen et al. | | |
| 2018/0331461 A1 | 11/2018 | An | | |

FOREIGN PATENT DOCUMENTS

| | | |
|---|---|---|
| CN | 203482529 U | 3/2014 |
| CN | 104378935 A | 2/2015 |
| CN | 205047017 U | 2/2016 |
| CN | 205531985 U | 8/2016 |
| CN | 207242431 U | 4/2018 |
| CN | 207460654 U | 6/2018 |
| CN | 208040237 U | 11/2018 |
| DE | 9404593 U1 * | 5/1994 |

OTHER PUBLICATIONS

The State Intellectual Property Office of People's Republic of China. First Office Action for CN Application No. 202010902400.7 and English translation, mailed Mar. 22, 2024, pp. 1-9.

The State Intellectual Property Office of People's Republic of China. First Search Report for CN Application No. 202010902400.7 and English translation, mailed Mar. 19, 2024, pp. 1-6.

* cited by examiner

MAINTENANCE WINDOW LOCKING DEVICE

CROSS-REFERENCE TO RELATED APPLICATION

This application is a national stage filing under 35 U.S.C. § 371 of international application number PCT/CN2021/115659, filed Aug. 31, 2021, which claims priority to Chinese patent application No. 202010902400.7 filed Sep. 1, 2020. The contents of these applications are incorporated herein by reference in their entirety.

TECHNICAL FIELD

The embodiments of the present application relate to, but are not limited to, the technical field of communications, and more particularly to, but are not limited to, a maintenance window locking device.

BACKGROUND

In the field of communications, there are more and more requirements for radio remote unit (RRU), active antenna unit (AAU) or the like, including smaller and smaller volume, higher and higher impression and operation, and convenience for engineering installation and subsequent maintenance. This requires that the structures of respective parts of a product should be as easy to operate as possible, and so should a maintenance window. At present, most of the commonly used maintenance windows are fixed and locked by hinges and screws, that is, a maintenance window cover and a maintenance window body are connected by a hinge, thereby realizing rotation. A cable outgoing position is located at one end opposite to the position where the maintenance window body is hinged. After a cable is drawn out from the maintenance window body, the maintenance window cover is rotated to be buckled with the maintenance window body, and then fixed to the maintenance window body with a screw, so as to compress sealing rubber materials fixed on the maintenance window body and the maintenance window cover, thereby preventing foreign matter and water from entering the maintenance window and improving the protection level of the ingress protection (IP) of the maintenance window.

The existing maintenance window locking structure requires at least two screws to realize the locking of the maintenance window cover and the maintenance window body. Therefore, corresponding operating tools must be carried on an engineering installation site. However, it is difficult and time-consuming to tighten the screws one by one under harsh environmental conditions. Meanwhile, the probability of protection failure of a maintenance window device due to incomplete tightening of the screws or other unreliable tightening reasons is also increased, thereby affecting the safe operation of the entire equipment.

SUMMARY

A maintenance window locking device provided by an embodiment of the present application aims to solve one of the related technical problems at least to a certain extent, including how to improve the protection level of the ingress protection of a maintenance window and the reliability of the maintenance window locking device.

In view of this, an embodiment of the present application provides a maintenance window locking device. The maintenance window locking device includes: a maintenance window body, a maintenance window cover, a fastening plate, a first limiting mechanism including a groove, and a roller. The fastening plate includes a fastening plate body and a pin which are of an integrated structure. The pin is rotatably connected to the roller. The maintenance window body is connected to a first end of the maintenance window cover. The fastening plate body is rotatably connected to a second end of the maintenance window cover. The first limiting mechanism is located on the maintenance window body. The fastening plate body drives the maintenance window cover to move toward the maintenance window body. The roller rolls along the first limiting mechanism until the roller is clamped into the groove, such that the maintenance window cover and the maintenance window body are tightly attached.

Other features and corresponding beneficial effects of the present application are set forth in subsequent parts of the description, and it should be understood that at least some of the beneficial effects will become apparent from the description of the present application.

Figure 1:
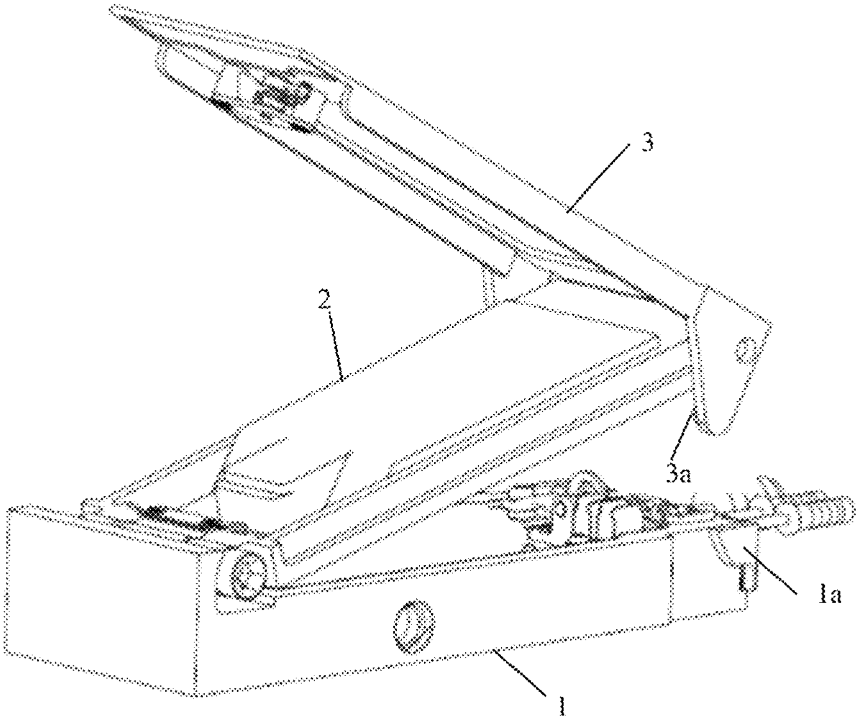
FIG. 1 is a schematic structural diagram of a maintenance window locking device according to example Embodiment one of the present application.

Reference numerals: 1 refers to maintenance window body; 2 refers to maintenance window cover; 3 refers to fastening plate; **1*a* refers to first limiting mechanism; 1*b* refers to rotating shaft; 1*c* refers to first shaft sleeve; 1*d*** refers to second shaft sleeve; le refers to support with a first connecting hole; 2*a*1 refers to baffle plate; 2*a*2 refers to threaded hole; 3*a* refers to roller; 3*b*1 refers to spring lock hook; 3*b*2 refers to captive screw; 3*c* refers to pin.

DETAILED DESCRIPTION

In order to make the objectives, technical schemes and advantages of the present application more clear, the embodiments of the present application will be further described in detail below through implementations in conjunction with the accompanying drawings. It should be understood that the embodiments described herein are only used to explain the present application, but not to limit the present application.

Example Embodiment One

In order to improve the protection level of the ingress protection of a maintenance window and the reliability of a maintenance window locking device, the present application provides a maintenance window locking device. The maintenance window locking device provided by the present application is described below with reference to the embodiments.

FIG. 1 is a schematic structural diagram of a maintenance window locking device according to example Embodiment one of the present application. The maintenance window locking device includes: a maintenance window body 1, a maintenance window cover 2, a fastening plate 3, a first limiting mechanism 1*a* including a groove, and a roller 3*a*. The fastening plate 3 includes a fastening plate body and a pin 3*c* (not shown in FIG. 1) which are of an integrated structure; the pin 3*c* is rotatably connected to the roller 3*a*. The maintenance window body 1 is hinged to a first end of the maintenance window cover 2. The fastening plate 3 body is rotatably connected to a second end of the maintenance window cover 2. The first limiting mechanism 1*a* is located on the maintenance window body 1. The fastening plate 3 body drives the maintenance window cover 2 to move toward the maintenance window body 1. The roller 3*a* rolls along the first limiting mechanism 1*a* until the roller is clamped into the groove, such that the maintenance window cover 2 and the maintenance window body 1 are tightly attached. The pin 3*c* is located on an inner side surface at an end of the fastening plate body where the fastening plate body is rotatably connected to the second end of the maintenance window cover. The fastening plate body may be in a shape of "hollow square (like a Chinese character "回") " or in a "U" shape. When the fastening plate body is in the shape of "hollow square", the fastening plate body further includes at least one strip structure or triangular structure at one end; and when the fastening plate body is in a "U" shape, the fastening plate 3 body further includes at least one strip structure or triangular structure at the open end, and the pin 3*c* rotatably connected to the roller 3*a* is located on an inner side surface of the strip structure or triangular structure. The pin 3*c* may include a first pin and a second pin. The roller 3*a* may include a first roller and a second roller. The first roller is rotatably connected to the first pin. The second roller is rotatably connected to the second pin.

Figure 2:
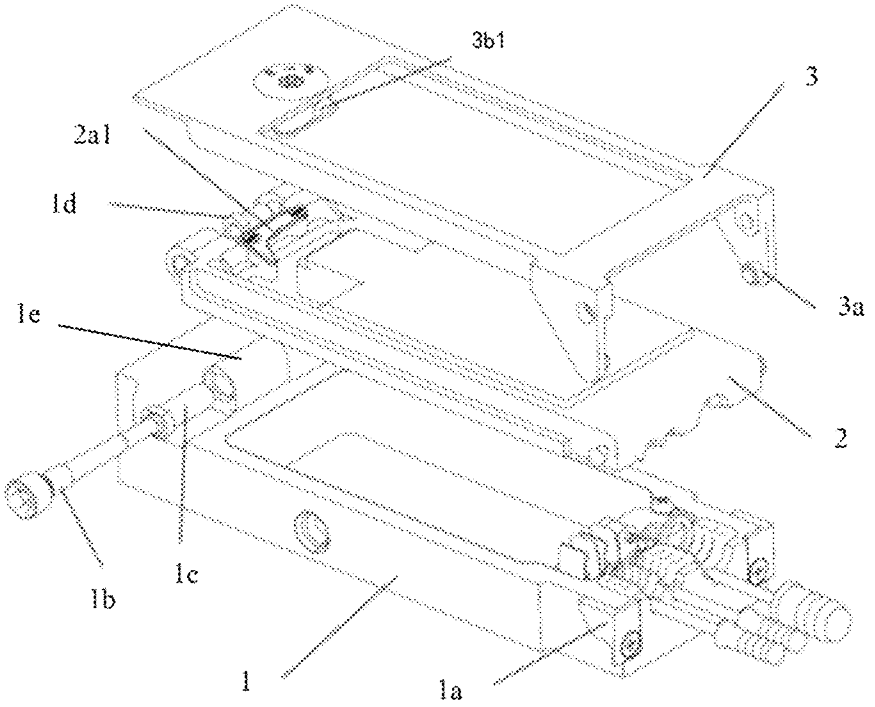
FIG. 2 is an exploded view of a maintenance window locking device according to example Embodiment two of the present application.
Figure 9:
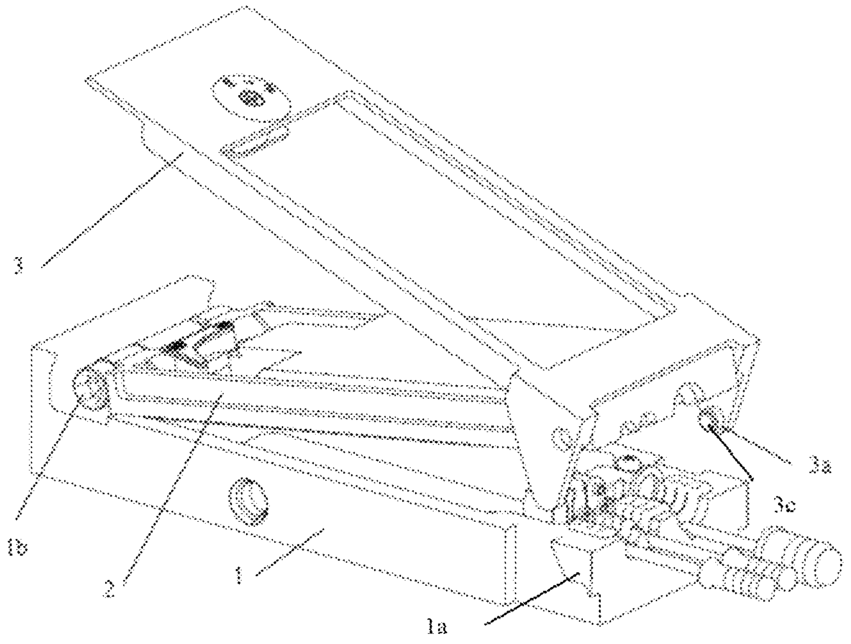
FIG. 9 is a schematic structural diagram of a maintenance window locking device according to example Embodiment three of the present application.

The first limiting mechanism 1*a* including the groove in this embodiment is located on the maintenance window body 1. The fastening plate 3 body drives the maintenance window cover 2 to move toward the maintenance window body 1. The roller 3*a* rolls along the first limiting mechanism 1*a* until the roller is clamped into the groove of the first limiting mechanism 1*a*, such that the maintenance window cover 2 and the maintenance window body 1 are tightly attached. An elastic sealing material is provided on the maintenance window cover 2 and/or on the maintenance window body 1. It is worth noting that the first limiting mechanism 1*a* may be mounted on the maintenance window body 1 as shown in FIG. 2, or the first limiting mechanism 1*a* and the maintenance window body 1 are of an integrated structure as shown in FIG. 9. When the first limiting mechanism 1*a* is integrated with the maintenance window body 1, the overall shape is compact and attractive, with a small occupied space and low manufacturing and mounting cost. It is worth noting that a size of the groove of the first limiting mechanism 1*a* may be larger than a size of the roller 3*a*, and may not be matched with the size of the roller 3*a*, such that the groove does not completely wrap the roller 3*a*, in which case the roller 3*a* can have a proper range of motion in the groove. The size of the groove may also be matched with the size of the roller 3*a*, that is, slightly larger than the size of the roller 3*a*, such that the roller 3*a* rolls along the first limiting mechanism 1*a* until the roller 3*a* is completely wrapped by the groove.

In some embodiments, a latching device may also be arranged on the fastening plate body, and a second limiting mechanism matched with the latching device is arranged on the maintenance window cover 2. The latching device may be a spring lock hook 3*b*1, a captive screw 3*b*2, a hook or the like. The second limiting mechanism may be a baffle plate 2*a*1 matched with the spring lock hook 3*b*1 or the hook, and the second limiting mechanism may also be a threaded hole 2*a*2 matched with the captive screw 3*b*2. The latching device on the fastening plate 3 body is matched with the second limiting mechanism, which can ensure that the roller 3*a* mechanism will not escape from the groove of the first limiting mechanism 1*a*, thereby ensuring the reliability in locking and sealing of the entire maintenance window device.

In some embodiments, the maintenance window locking device may further include: a rotating shaft 1*b*, and a support 1*e* with a first connecting hole. The support with the hole is arranged on the maintenance window body 1. A second connecting hole is formed at the first end of the maintenance window cover 2. The maintenance window body 1 is hinged to the first end of the maintenance window cover 2, including: the rotating shaft 1*b* passes through the second connecting hole at the first end of the maintenance window cover 2 and into the first connecting hole, and a tightening nut locks the rotating shaft 1*b*, the maintenance window body 1 and the maintenance window cover 2. The maintenance window locking device may further include a shaft sleeve or a pressing block. The shaft sleeve is clamped between the rotating shaft 1*b* and the first connecting hole. The shaft sleeve and the rotating shaft 1*b* are in tight fit to a certain amount of interference, so as to bring damping to rotation and ensure that the maintenance window cover 2 will not automatically rotate and fall due to the influence of gravity in a free state after opening. In some examples, the first connecting hole may be a blind hole, which allows the shaft to pass through from one side without the need for structural avoidance on the other side. During production and engineering maintenance, the maintenance window cover 2 may be removed and replaced from one side, thereby improving the reliability and convenience of the product. In some embodiments, the second connecting hole may also be a blind hole, but the first connecting hole is a through hole; and the maintenance window body 1 is hinged to the first end of the maintenance window cover 2, including: the rotating shaft 1*b* passes through the first connecting hole and into the second connecting hole, and a tightening nut locks the rotating shaft 1*b*, the maintenance window body 1 and the maintenance window cover 2.

In some embodiments, a third connecting hole may be formed at the first end of the maintenance window cover 2. The third connecting hole is a blind hole, and both the first connecting hole and the second connecting hole are through holes. The maintenance window body 1 is hinged to the first end of the maintenance window cover 2, including: the rotating shaft 1*b* passes through the second connecting hole and the first connecting hole formed at the first end of the maintenance window cover 2 and into the third connecting hole, and a tightening nut locks the rotating shaft 1*b*, the maintenance window body 1 and the maintenance window cover 2. When the third connecting hole is further formed at the first end of the maintenance window cover 2, the shaft sleeve in the maintenance window locking device may include a first shaft sleeve 1*c* and a second shaft sleeve 1*d*. The first shaft sleeve 1*c* is clamped between the rotating shaft 1*b* and the first connecting hole, and the second shaft sleeve is clamped between the rotating shaft 1*b* and the third connecting hole.

An embodiment of the present application provides a maintenance window locking device, which includes a maintenance window body, a maintenance window cover, a fastening plate, a first limiting mechanism including a groove, and a roller. The fastening plate includes a fastening plate body and a pin which are of an integrated structure. The pin is rotatably connected to the roller. The maintenance window body is hinged to a first end of the maintenance window cover. The fastening plate body is rotatably connected to a second end of the maintenance window cover. The first limiting mechanism is located on the maintenance window body. The fastening plate body drives the maintenance window cover to move toward the maintenance window body. The roller rolls along the first limiting mechanism until the roller is clamped into the groove, such that the maintenance window cover and the maintenance window body are tightly attached to compress rubber sealing materials respectively fixed on the maintenance window cover and the maintenance window body, till the maintenance window cover and the maintenance window body are completely closed and locked, thereby achieving a sealing effect. Therefore, the protection level of the ingress protection of the maintenance window and the reliability of the maintenance window locking device are improved.

Example Embodiment Two

A maintenance window locking device of the present application improves the protection level of the ingress protection of a maintenance window and the reliability of the maintenance window locking device. For the convenience of understanding, a maintenance window locking device provided by the present application is described below by an example.

Figure 3:
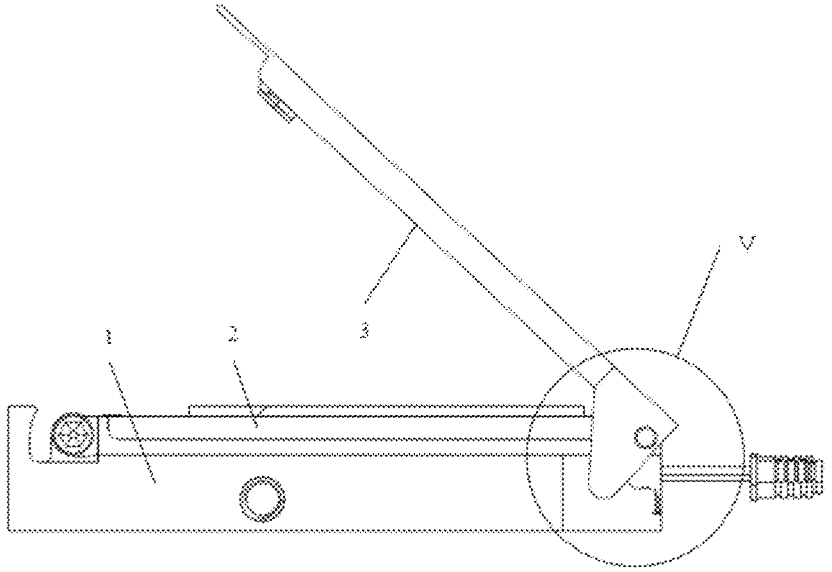
FIG. 3 is a side view of a fastening plate relative to a maintenance window body when a maintenance window is closed according to example Embodiment two of the present application.
Figure 4:
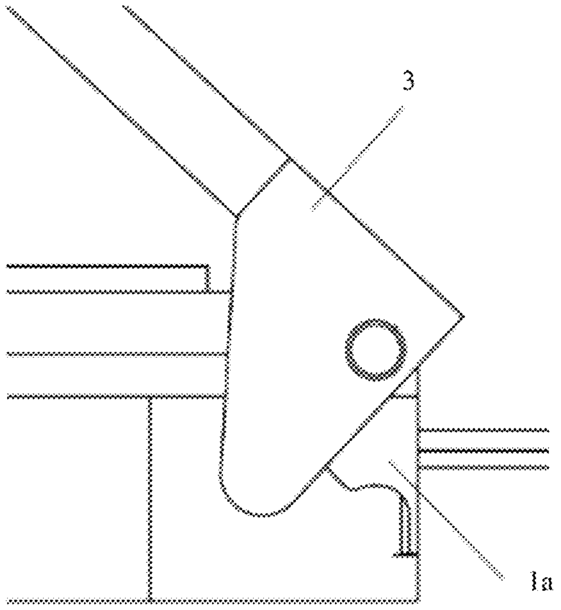
FIG. 4 is a partial enlarged view of a position of a first limiting mechanism relative to a roller according to example Embodiment two of the present application.
Figure 5:
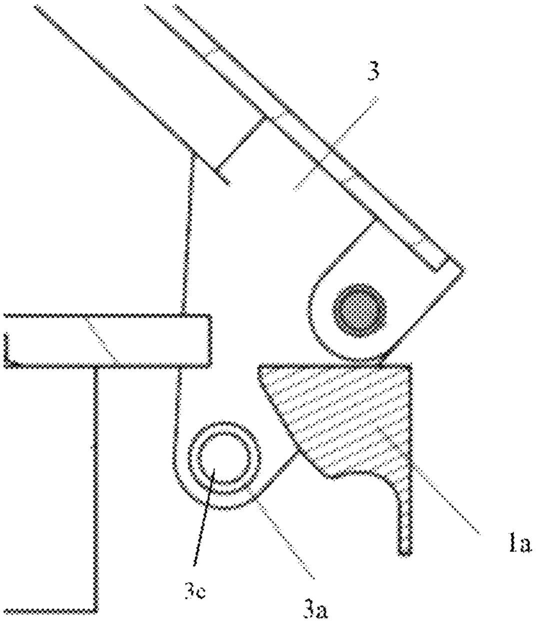
FIG. 5 is a sectional view corresponding to the partial enlarged view of FIG. 4.

FIG. 2 is an exploded view of a maintenance window locking device according to example Embodiment two of the present application. The maintenance window locking device includes a maintenance window body 1, a maintenance window cover 2, a fastening plate 3, a first limiting mechanism 1*a* including a groove, a roller 3*a*, a spring lock hook 3*b*1, and a second limiting mechanism. The fastening plate 3 includes a fastening plate 3 body and a pin 3*c* which are of an integrated structure. The pin 3*c* is rotatably connected to the roller 3*a*; the maintenance window body 1 is hinged to a first end of the maintenance window cover 2. The spring lock hook 3*b*1 is mounted on the fastening plate body, and the second limiting mechanism matched with the spring lock hook 3*b*1 is arranged on the maintenance window cover 2. The second limiting mechanism is a baffle plate 2*a*1. The first limiting mechanism 1*a* is mounted on the maintenance window body 1. The fastening plate body is rotatably connected to a second end of the maintenance window cover 2. The first limiting mechanism 1*a* is located on the maintenance window body 1. The fastening plate body drives the maintenance window cover 2 to move toward the maintenance window body 1. The roller 3*a* rolls along the first limiting mechanism 1*a* until the roller is clamped into the groove, such that a rubber sealing material on the maintenance window cover 2 and the maintenance window body 1 are tightly attached. FIG. 3 shows a view when the roller 3*a* and the first limiting mechanism 1*a* are matched to close and lock the maintenance window, the partial enlarged views may refer to FIG. 4 and FIG. 5. The fastening plate 3 is connected to the other end of the maintenance window cover 2 through pins at both sides. Rollers are respectively mounted on the pins inwardly extending at both sides of the end of the fastening plate 3 (below rotating shafts at both sides). The rollers are capable of freely rotating about the respective pins. When the fastening plate 3 drives the maintenance window cover 2 to move, the roller 3*a* may be attached to the first limiting mechanism 1*a* mounted on the maintenance window body 1 and roll along the first limiting mechanism 1*a* until the roller is clamped into the groove of the first liming mechanism 1*a*. At this time, the maintenance window cover 2 is just attached to the maintenance window body 1 to compress the sealing materials. In this case, the maintenance window cover 2 and the maintenance window body 1 are completely closed and locked to achieve a sealing effect.

Figure 6:
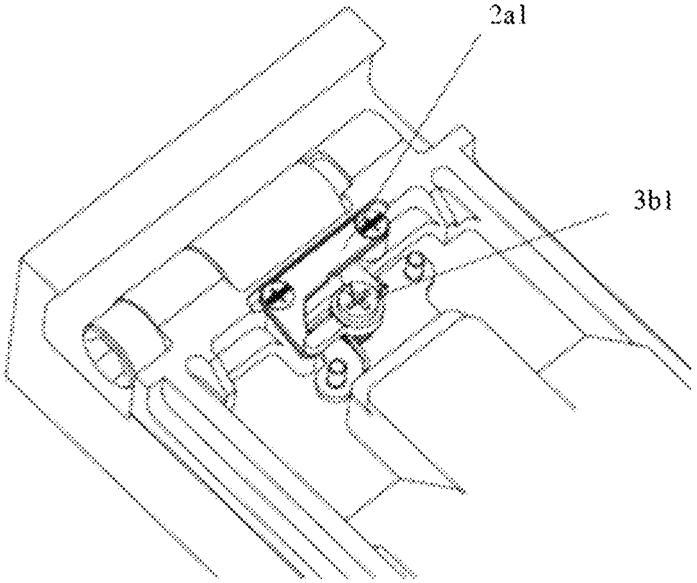
FIG. 6 is a partial enlarged view of a position of a spring lock hook relative to a baffle plate after the maintenance window is locked according to example Embodiment two of the present application.
Figure 7:
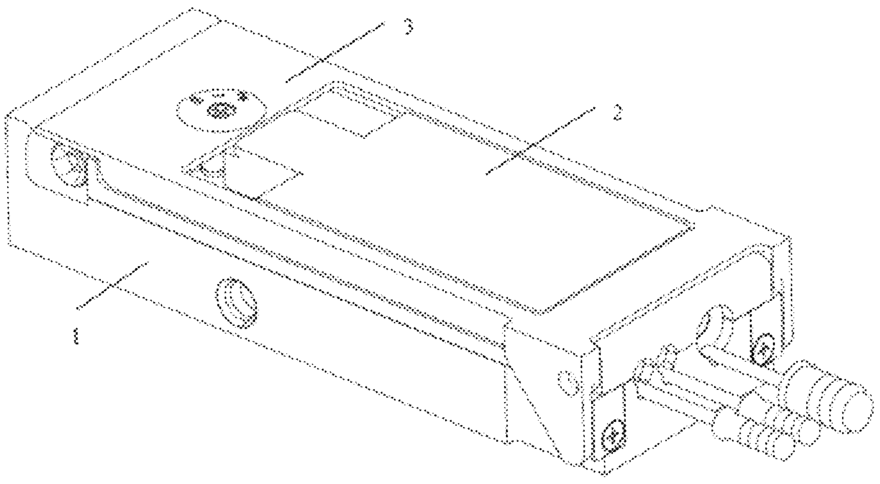
FIG. 7 is a schematic structural diagram after the maintenance window locking device is locked according to example Embodiment two of the present application.

The spring lock hook 3*b*1 and the limiting baffle plate 2*a*1 in this embodiment are shown in FIG. 6. The spring lock hook 3*b*1 is mounted on the fastening plate 3, and the baffle plate 2*a*1 is mounted at a corresponding position on the maintenance window cover 2. When the maintenance window cover 2 and the maintenance window body 1 are attached to compress the sealing materials, the spring lock hook 3*b*1 can be clamped into the limiting baffle plate 2*a*1, such that the roller 3*a* will not escape from the groove of the first limiting mechanism 1*a* due to vibration or other external forces, thereby ensuring the reliability in locking and sealing of the entire maintenance window device. FIG. 7 is a schematic diagram after the maintenance window locking device of the present application is completely locked, with a small overall occupied space, as well as beautiful and generous appearance.

Figure 8:
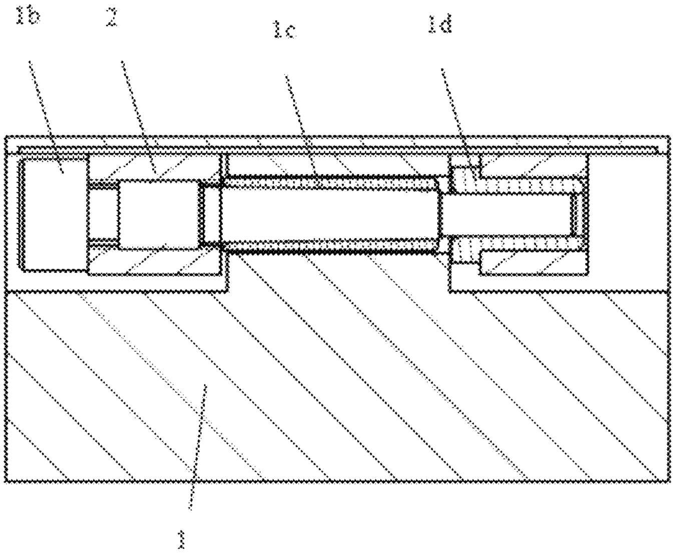
FIG. 8 is a sectional view after a maintenance window body, a maintenance window cover, a rotating shaft and a shaft sleeve are assembled according to example Embodiment two of the present application.

The maintenance window locking device further includes a rotating shaft 1*b* and a support 1*e* with a first connecting hole, where the support with the hole is arranged on the maintenance window body 1, and a second connecting hole and a third connecting hole are formed at the first end of the maintenance window cover 2. The third connecting hole is a blind hole, and both the first connecting hole and the second connecting hole are through holes. The maintenance window body 1 is hinged to the first end of the maintenance window cover 2, including: the rotating shaft 1*b* passes through the second connecting hole and the first connecting hole formed at the first end of the maintenance window cover 2 and into the third connecting hole, and a tightening nut locks the rotating shaft 1*b*, the maintenance window body 1 and the maintenance window cover 2. When the third connecting hole is further formed at the first end of the maintenance window cover 2, the shaft sleeve may include a first shaft sleeve 1*c* and a second shaft sleeve 1*d*. In the sectional view shown in FIG. 8, the first shaft sleeve 1*c* is clamped between the rotating shaft 1*b* and the first connecting hole, and the second shaft sleeve 1*d* is clamped between the rotating shaft 1*b* and the third connecting hole. The shaft sleeve and the rotating shaft 1*b* are in tight fit to a certain amount of interference. During the tightening process of the rotating shaft 1*b*, two sections of tapered polished shafts in the middle and at the rear end of the rotating shaft 1*b* may press the shaft sleeve 1*c* and the shaft sleeve 1*d* to the right, so as to form a damping effect when the maintenance window cover 2 rotates around a hinge mechanism. Therefore, it is ensured that when being opened and in a free state, the maintenance window cover 2 will not fall automatically due to the influence of gravity, thereby having no influence on the installation on the engineering site, and meanwhile ensuring the safety of related operations.

An embodiment of the present application provides a maintenance window locking device, which includes a maintenance window body, a maintenance window cover, a fastening plate, a first limiting mechanism including a groove, a roller, a spring lock hook and a second limiting mechanism. The fastening plate includes a fastening plate body and a pin which are of an integrated structure. The pin is rotatably connected to the roller. The maintenance window body 1 is hinged to a first end of the maintenance window cover; and the spring lock hook is mounted on the fastening plate body, and the second limiting mechanism matched with the spring lock hook is arranged on the maintenance window cover. The second limiting mechanism is a baffle plate. The first limiting mechanism is mounted on the maintenance window body. The fastening plate body is rotatably connected to a second end of the maintenance window cover. The first limiting mechanism is located on the maintenance window body. The fastening plate body drives the maintenance window cover to move toward the maintenance window body. The roller rolls along the first limiting mechanism until the roller is clamped into the groove, such that a rubber sealing material on the maintenance window cover and the maintenance window body are tightly attached to compress rubber sealing materials respectively fixed on the maintenance window cover and the maintenance window body, till the maintenance window cover and the maintenance window body are completely closed and locked, thereby achieving a sealing effect. Therefore, the protection level of the ingress protection of the maintenance window and the reliability of the maintenance window locking device are improved. Since the spring lock hook is matched with the second limiting mechanism, the roller cannot escape from the groove of the first limiting mechanism due to vibration or other external forces, thereby ensuring the reliability in locking and sealing of the entire maintenance window device.

Example Embodiment Three

A maintenance window locking device of the present application improves the protection level of the ingress protection of a maintenance window and the reliability of the maintenance window locking device. For the convenience of understanding, another maintenance window locking device provided by the present application is described below by an example.

Figure 10:
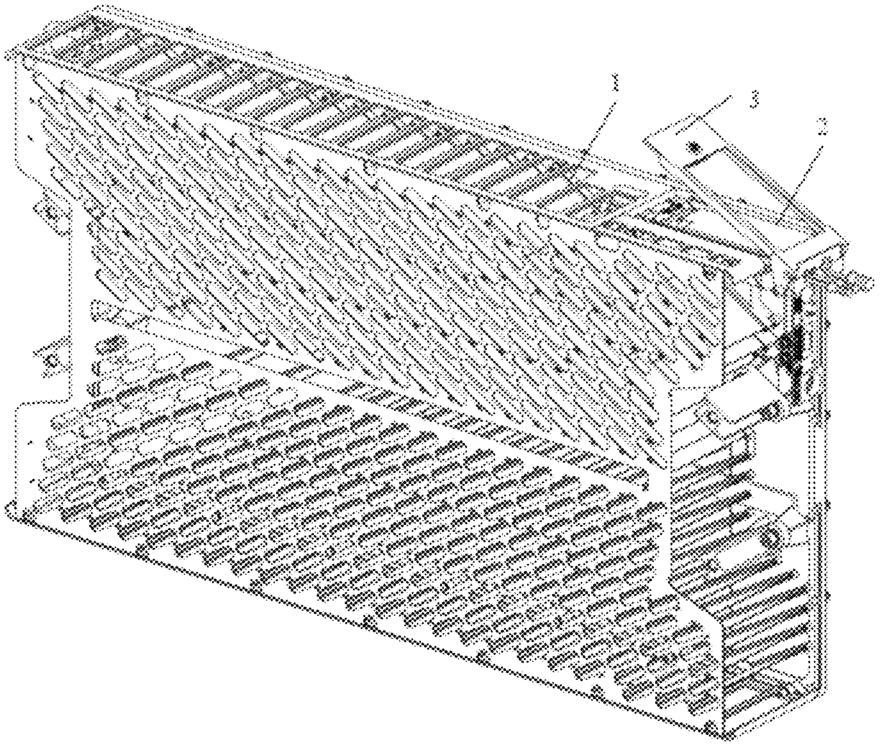
FIG. 10 is a schematic diagram of a mounting position of the maintenance window locking device applied to AUU according to example Embodiment three of the present application.

FIG. 9 is a schematic structural diagram of a maintenance window locking device according to example Embodiment three of the present application. The maintenance window locking device includes a maintenance window body 1, a maintenance window cover 2, a fastening plate 3, a first limiting mechanism 1*a* including a groove, a roller 3*a*, a spring lock hook 3*b*1, and a second limiting mechanism. The fastening plate 3 includes a fastening plate 3 body and a pin 3*c* which are of an integrated structure. The pin 3*c* is rotatably connected to the roller 3*a*. The maintenance window body 1 is hinged to a first end of the maintenance window cover 2. The spring lock hook 3*b*1 is mounted on the fastening plate 3 body, and the second limiting mechanism matched with the spring lock hook 3*b*1 is arranged on the maintenance window cover 2. The second limiting mechanism is a baffle plate 2*a*1. The fastening plate 3 body is rotatably connected to a second end of the maintenance window cover 2. The first limiting mechanism 1*a* is located on the maintenance window body 1. The fastening plate 3 body drives the maintenance window cover 2 to move toward the maintenance window body 1. The roller 3*a* rolls along the first limiting mechanism 1*a* until the roller is clamped into the groove, such that a rubber sealing material on the maintenance window cover 2 and the maintenance window body 1 are tightly attached. The difference from example Embodiment two lies in that the first limiting mechanism 1*a* and the maintenance window body 1 are of an integrated structure, which reduces the number of parts and the processing and mounting cost. The maintenance window locking device may be applied to an AAU or RRU. FIG. 10 is a schematic diagram of example Embodiment three of the present application specifically applied to a certain type of AUU. A maintenance window is integrated with an AAU body, achieving a compact and attractive overall shape, small occupied space and low manufacturing and mounting cost.

An embodiment of the present application provides a maintenance window locking device, which includes a maintenance window body, a maintenance window cover, a fastening plate, a first limiting mechanism including a groove, a roller, a spring lock hook and a second limiting mechanism. The fastening plate includes a fastening plate body and a pin which are of an integrated structure. The pin is rotatably connected to the roller. The maintenance window body is hinged to a first end of the maintenance window cover. The spring lock hook is mounted on the fastening plate body, and the second limiting mechanism matched with the spring lock hook is arranged on the maintenance window cover. The second limiting mechanism is a baffle plate. The first limiting mechanism and the maintenance window body are of an integrated structure. The fastening plate body is rotatably connected to a second end of the maintenance window cover; the first limiting mechanism is located on the maintenance window body; the fastening plate body drives the maintenance window cover to move toward the maintenance window body; and the roller rolls along the first limiting mechanism until the roller is clamped into the groove, such that a rubber sealing material on the maintenance window cover and the maintenance window body are tightly attached to compress the rubber sealing materials respectively fixed on the maintenance window cover and the maintenance window body, till the maintenance window cover and the maintenance window body are completely closed and locked, thereby achieving a sealing effect. Therefore, the protection level of the ingress protection of the maintenance window and the reliability of the maintenance window locking device are improved, the number of parts is decreased, and the processing and mounting cost is reduced.

Embodiment Four

A maintenance window locking device of the present application improves the protection level of the ingress protection of a maintenance window and the reliability of the maintenance window locking device. For the convenience of understanding, another maintenance window locking device provided by the present application is described below by an example.

Figure 11:
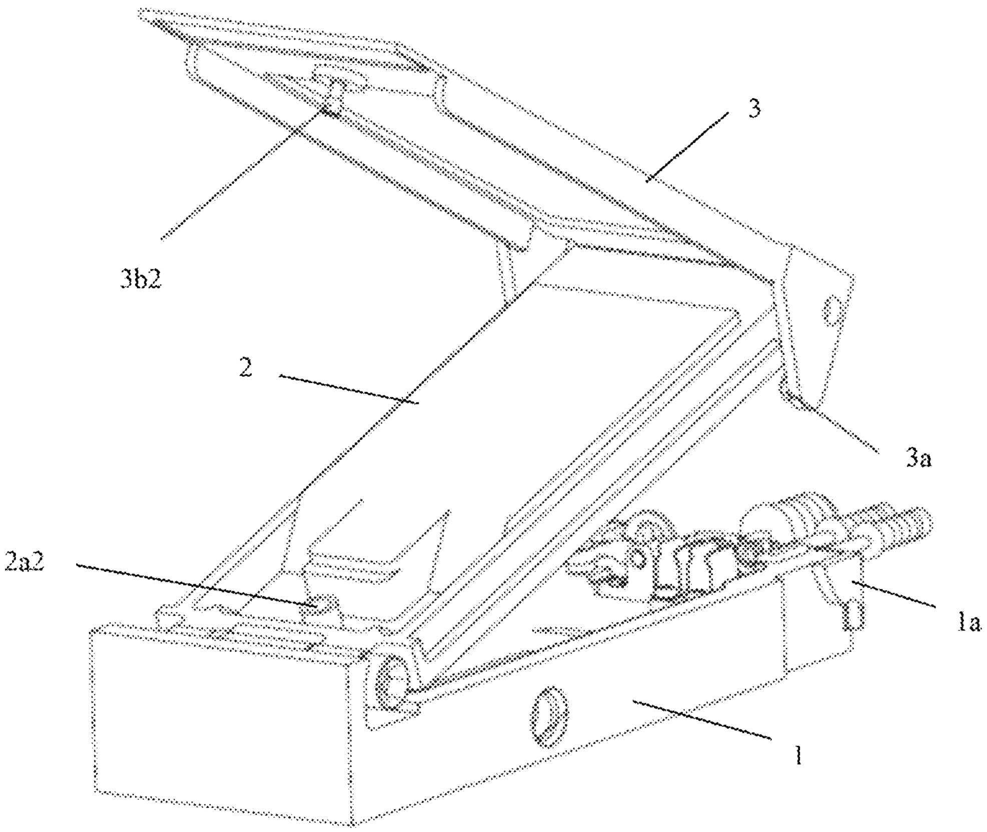
FIG. 11 is a schematic structural diagram of a maintenance window locking device according to Embodiment 4 of the present application.

FIG. 11 is a schematic structural diagram of a maintenance window locking device of Embodiment four. The maintenance window locking device includes a maintenance window body 1, a maintenance window cover 2, a fastening plate 3, a first limiting mechanism 1*a* including a groove, a roller 3*a*, a captive screw 3*b*2, and a second limiting mechanism. The fastening plate 3 includes a fastening plate 3 body and a pin 3*c* which are of an integrated structure. The pin 3*c* is rotatably connected to the roller 3*a*. The maintenance window body 1 is hinged to a first end of the maintenance window cover 2. The captive screw 3*b*2 is mounted on the fastening plate 3 body, and the second limiting mechanism matched with the captive screw 3*b*2 is arranged on the maintenance window cover 2. The second limiting mechanism is a threaded hole 2*a*2. The first limiting mechanism 1*a* is mounted on the maintenance window body 1. The fastening plate 3 body is rotatably connected to a second end of the maintenance window cover 2. The first limiting mechanism 1*a* is located on the maintenance window body 1. The fastening plate 3 body drives the maintenance window cover 2 to move toward the maintenance window body 1. The roller 3*a* rolls along the first limiting mechanism 1*a* until the roller is clamped into the groove, such that a rubber sealing material on the maintenance window cover 2 and the maintenance window body 1 are tightly attached. The captive screw 3*b*2 is used to replace the combination of the spring lock hook 3*b*1 and the limiting baffle plate 2*a*1 matched therewith, which reduces the number of parts and the cost.

Figure 12:
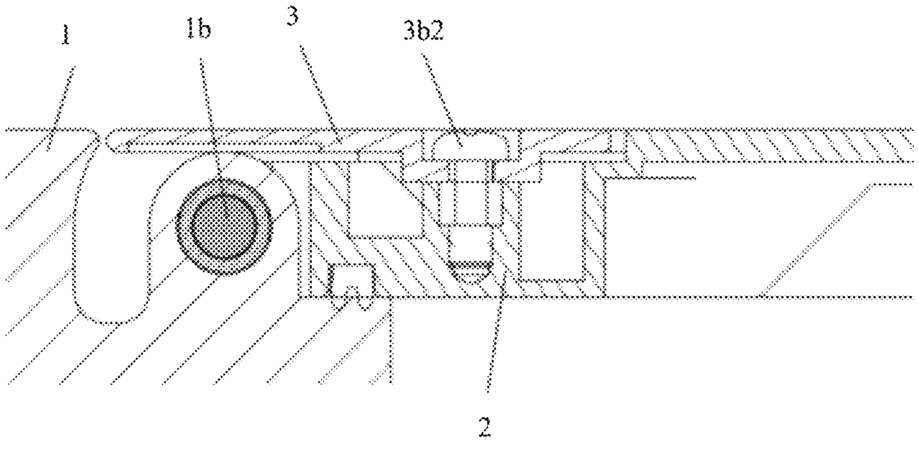
FIG. 12 is a partial enlarged sectional view after a captive screw is locked to a maintenance window cover according to Embodiment 4 of the present application.

As shown in FIG. 12, after the maintenance window cover 22 is fully buckled with the maintenance window body 11, the captive screw 3*b*2 may be fastened to the corresponding threaded hole 2*a*2 in the maintenance window cover 22, thereby ensuring the reliability in locking and sealing of the entire maintenance window device.

An embodiment of the present application provides a maintenance window locking device, which includes a maintenance window body, a maintenance window cover, a fastening plate, a first limiting mechanism including a groove, and a roller. The fastening plate includes a fastening plate body and a pin which are of an integrated structure. The pin is rotatably connected to the roller. The maintenance window body is connected to a first end of the maintenance window cover. The fastening plate body is rotatably connected to a second end of the maintenance window cover. The first limiting mechanism is located on the maintenance window body. The fastening plate body drives the maintenance window cover to move toward the maintenance window body. The roller rolls along the first limiting mechanism until the roller is clamped into the groove, such that the maintenance window cover and the maintenance window body are tightly attached. In some implementations, the operation, including but is not limited to locking the maintenance window is easy to achieve and relatively high in efficiency. Meanwhile, the protection level of the ingress protection of the maintenance window is improved, and the maintenance window locking device is more reliable.

An embodiment of the present application provides a maintenance window locking device, which includes a maintenance window body, a maintenance window cover, a fastening plate, a first limiting mechanism including a groove, a roller, a captive screw and a second limiting mechanism. The fastening plate includes a fastening plate body and a pin which are of an integrated structure. The pin is rotatably connected to the roller. The maintenance window body is hinged to a first end of the maintenance window cover. The captive screw is mounted on the fastening plate body, and the second limiting mechanism matched with the captive screw is arranged on the maintenance window cover. The second limiting mechanism is a threaded hole. The first limiting mechanism is mounted on the maintenance window body. The fastening plate body is rotatably connected to a second end of the maintenance window cover. The first limiting mechanism is located on the maintenance window body. The fastening plate body drives the maintenance window cover to move toward the maintenance window body. The roller rolls along the first limiting mechanism until the roller is clamped into the groove, such that a rubber sealing material on the maintenance window cover and the maintenance window body are tightly attached to compress rubber sealing materials respectively fixed on the maintenance window cover and the maintenance window body, till the maintenance window cover and the maintenance window body are completely closed and locked, thereby achieving a sealing effect. Therefore, the protection level of the ingress protection of the maintenance window and the reliability of the maintenance window locking device are improved, the number of parts is decreased, and the processing and mounting cost is reduced.

The above content is a further detailed description of the embodiments of the present application in conjunction with specific implementations, and it cannot be considered that the specific implementations of the present application are limited to these descriptions. For those of ordinary skill in the art to which the present application belongs, several simple deductions or substitutions can be made without departing from the concept of the present application, which should be regarded as falling within the protection scope of the present application.

The invention claimed is:

1. A maintenance window locking device, comprising:

a maintenance window body, a maintenance window cover, a fastening plate, a first limiting mechanism comprising a groove, and a roller, wherein the fastening plate comprises a fastening plate body and a pin which are of an integrated structure;

the pin is rotatably connected to the roller;

the maintenance window body is hinged to a first end of the maintenance window cover;

the fastening plate body is rotatably connected to a second end of the maintenance window cover;

the first limiting mechanism is located on the maintenance window body;

the fastening plate body is configured for driving the maintenance window cover to move toward the maintenance window body, so as to allow the roller to roll along the first limiting mechanism until the roller is clamped into the groove, to tightly attached the maintenance window cover with the maintenance window body;

wherein a latching device is arranged on the fastening plate body, and a second limiting mechanism matched with the latching device is arranged on the maintenance window cover, and wherein the latching device comprises a spring lock hook, and the second limiting mechanism is a baffle plate.

2. The maintenance window locking device of claim 1, wherein the first limiting mechanism and the maintenance window body are of an integrated structure or the first limiting mechanism is mounted on the maintenance window body.

3. The maintenance window locking device of claim 1, wherein the groove has a size matched with a size of the roller, so as to allow the roller roll along the first limiting mechanism until the roller is completely wrapped by the groove.

4. The maintenance window locking device of claim 1, further comprising:

a support with a first connecting hole, wherein the support with the first connecting hole is arranged on the maintenance window body;

a second connecting hole formed at a first end of the maintenance window cover; and a rotating shaft configured for passing through the second connecting hole formed at the first end of the maintenance window cover and into the first connecting hole, so as to a lock the rotating shaft, the maintenance window body and the maintenance window cover with a tightening nut.

5. The maintenance window locking device of claim 4, further comprising:

a shaft sleeve clamped between the rotating shaft and the first connecting hole.

6. The maintenance window locking device of claim 4, wherein the first connecting hole is a blind hole.

7. The maintenance window locking device of claim 4, further comprising:

a third connecting hole formed at the first end of the maintenance window cover;

wherein the third connecting hole is a blind hole;

wherein the rotating shaft is further configured for passing through the second connecting hole formed at the first end of the maintenance window cover and the first connecting hole and into the third connecting hole, so as to lock the rotating shaft, the maintenance window body and the maintenance window cover with the tightening nut.

* * * * *